US012722685B2

(12) United States Patent
Saito et al.

(10) Patent No.: US 12,722,685 B2
(45) Date of Patent: Sep. 1, 2026

(54) STEERING APPARATUS

(71) Applicant: SUBARU CORPORATION, Tokyo (JP)

(72) Inventors: Takumu Saito, Tokyo (JP); Hirotaka Masuda, Tokyo (JP); Tomoya Kawamura, Tokyo (JP); Yuki Arikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/380,276

(22) Filed: Nov. 5, 2025

(65) Prior Publication Data

US 2026/0145728 A1 May 28, 2026

(30) Foreign Application Priority Data

Nov. 27, 2024 (JP) ................................ 2024-206151

(51) Int. Cl.
*B62D 1/19* (2006.01)

(52) U.S. Cl.
CPC ..................................... *B62D 1/19* (2013.01)

(58) Field of Classification Search
CPC .............. B62D 1/184; B62D 1/19; F16F 1/38
See application file for complete search history.

(56) References Cited

U.S. PATENT DOCUMENTS 7,658,125 B2 * 2/2010 Inayoshi ................ B62D 7/224 280/775
9,415,796 B2 * 8/2016 Hagiwara .............. B62D 1/184
11,390,057 B2 * 7/2022 Fiero ........................ B32B 15/18
2005/0019590 A1 * 1/2005 Josefsson ............. G10K 11/168 428/457
2009/0031844 A1 * 2/2009 Iwakawa ................ B62D 1/181 74/493
2018/0105135 A1 * 4/2018 Keats ....................... F16F 7/116
2019/0047608 A1 * 2/2019 Ishikawa ................ B62D 1/184
2020/0031383 A1 * 1/2020 Ponikiewski .......... B62D 1/184

FOREIGN PATENT DOCUMENTS

CN 108602524 B * 2/2021 ............. B62D 1/184
CN 113978541 A * 1/2022 ............. B62D 1/187
DE 102006009304 B3 * 7/2007 ............. B62D 1/184

(Continued)

*Primary Examiner* — Nicole T Verley
(74) *Attorney, Agent, or Firm* — Rimon P.C.

(57) ABSTRACT

A steering apparatus includes a steering shaft to an end portion of which a steering wheel is fixed; a steering column supporting the steering shaft while allowing the steering shaft to rotate; and a support bracket fixed to a vehicle body frame and supporting a portion of the steering column that is located close to the steering wheel. The support bracket includes a pair of clamp plates disposed opposite each other and configured to clamp the steering column at two opposite side surfaces of the steering column. The clamp plates each have a multilayer structure including steel sheets and damping matter interposed between each adjacent two of the steel sheets. The steel sheets and the damping matter are stacked in a direction in which the steering column is to be clamped. The clamp plates each include a bead projecting outward and extending in a top-bottom direction.

5 Claims, 4 Drawing Sheets

(56) References Cited

FOREIGN PATENT DOCUMENTS

| | | | | | |
|---|---|---|---|---|---|
| EP | 0802104 | A1 | * | 10/1997 | ............. B62D 1/184 |
| JP | 2014237397 | A | * | 12/2014 | |
| JP | 2018062986 | A | * | 4/2018 | ................ F16F 7/00 |
| JP | 6930198 | B2 | * | 9/2021 | ........... B60R 25/021 |
| JP | 2024-147119 | A | | 10/2024 | |
| TW | 536502 | B | * | 6/2003 | ............. B62D 7/224 |
| WO | WO-2012157703 | A1 | * | 11/2012 | ............... B62D 5/04 |
| WO | WO-2016076266 | A1 | * | 5/2016 | ............. B62D 1/195 |
| WO | WO-2016114034 | A1 | * | 7/2016 | ............. B62D 1/192 |
| WO | WO-2017135384 | A1 | * | 8/2017 | ............. B62D 1/184 |

* cited by examiner

STEERING APPARATUS

CROSS-REFERENCE TO RELATED APPLICATIONS

The present application claims priority from Japanese Patent Application No. 2024-206151 filed on Nov. 27, 2024, the entire contents of which are hereby incorporated by reference.

BACKGROUND

The disclosure relates to a steering apparatus.

Steering vibration is one of vibrations and noises received by a vehicle, such as an automobile, that is traveling. Steering vibration is a phenomenon in which an input received by a traveling vehicle from a road surface having irregularities is transmitted through the tires, the suspension, and the body of the vehicle to excite vibration in the steering wheel. If the steering shaft resonates, the driver who is gripping the steering wheel perceives the resonance as vibration of the steering wheel.

To reduce such vibration and noise caused by steering vibration, the resonance frequencies of components constituting a steering apparatus, including a steering wheel, a steering column, and a steering support beam, may be set within a band different from the resonance frequencies occurring on a vibration transmission path (the tires, the suspension, the vehicle body, and so forth).

To set the resonance frequencies of components constituting the steering apparatus within a band different from the resonance frequencies of components constituting the vibration transmission path, the materials, the shapes, the layouts, and the like of the components need to be redesigned, which is impractical.

According to a technique disclosed in Japanese Unexamined Patent Application Publication (JP-A) No. 2024-147119 for example, a support for supporting an airbag module inside a steering wheel is used as a dynamic damper to damp the vibration transmitted to the steering wheel.

SUMMARY

An aspect of the disclosure provides a steering apparatus including a steering shaft, a steering column, and a support bracket. A steering wheel is fixed to an end portion of the steering shaft. The steering column supports the steering shaft while allowing the steering shaft to rotate. The support bracket is fixed to a vehicle body frame and supports a portion of the steering column. The portion is located close to the steering wheel. The support bracket includes a pair of clamp plates disposed opposite each other and configured to clamp the steering column at two opposite side surfaces of the steering column. The clamp plates each have a multi-layer structure including a plurality of steel sheets and damping matter interposed between each adjacent two of the steel sheets. The steel sheets and the damping matter are stacked in a direction in which the steering column is to be clamped. The clamp plates each include a bead projecting outward and extending in a top-bottom direction.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique disclosed in JP-A No. 2024-147119, since the dynamic damper is used as the support for the airbag module, there is a disadvantage that the mass of an airbag device increases.

If the mass of the airbag device increases, the rigidity of the steering shaft that supports the steering wheel needs to be increased correspondingly. Furthermore, the rigidity of a tilt bracket that supports the steering shaft via the steering column needs to be increased. However, if the rigidity of the tilt bracket is increased, the ease of operation of the tilt bracket is deteriorated, imposing inconvenience on the driver.

It is desirable to provide a steering apparatus in which steering vibration is damped effectively with no redesigning of components constituting the steering apparatus and no increase in the rigidity of the components.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
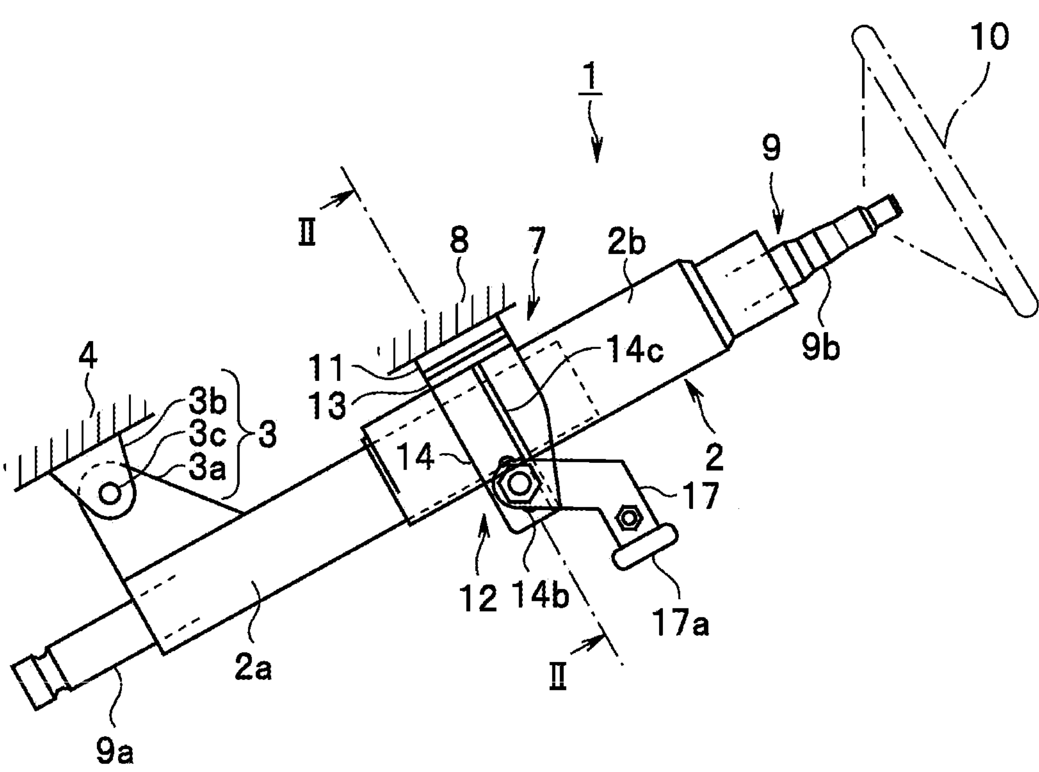
FIG. 1 is a schematic side view of a steering apparatus.

FIG. 1 illustrates a steering apparatus 1. The steering apparatus 1 includes a steering column 2. The steering column 2 is oriented with a rear end portion thereof facing the driver's seat and with a front end portion thereof extending obliquely toward a lower front part of the vehicle body. The steering column 2 has a cylindrical shape. The steering column 2 includes an inner column 2*a* forming a front part thereof, and an outer column 2*b* forming a rear part thereof. A rear end portion of the inner column 2*a* extends into a front end portion of the outer column 2*b* while being allowed to slide in the axial direction.

A clevis receiving portion 3*a* included in a clevis 3 is fixed to an upper part of a front end portion of the inner column 2*a*. A clevis support 3*b* also included in the clevis 3 is fixed to a vehicle body frame 4. The clevis receiving portion 3*a* is coupled to the clevis support 3*b* via a clevis pin 3*c*. The steering column 2 is supported in such a manner as to be swingable in a top-bottom direction about the clevis 3 and relative to the vehicle body frame 4.

A middle portion of the outer column 2*b* is secured to a steering support beam 8 via a support bracket 7. The steering support beam 8 is disposed inside an instrument panel (not illustrated) of the vehicle. The steering support beam 8 extends horizontally toward two opposite sides in the vehicle width direction, with two end portions thereof fixed to the vehicle body frame 4.

A steering shaft 9 extends through the steering column 2. The steering shaft 9 includes an inner shaft 9*a* and an outer shaft 9*b*. The inner shaft 9*a* extends through the inner column 2*a* and is rotatably supported via a bearing (not illustrated). The outer shaft 9*b* extends through the outer column 2*b* and is rotatably supported via a bearing (not illustrated). A rear end portion of the inner shaft 9*a* and a front end portion of the outer shaft 9*b* are in engagement with each other via a slidable torque transmission element such as a spline.

A rear end portion of the outer shaft 9*b* projects from the rear end of the steering column 2 toward the driver's seat. A steering wheel 10 is fixed to the rear end portion of the outer shaft 9*b*. A front end portion of the inner shaft 9*a* projects from the front end of the steering column 2 toward the front of the vehicle body. Although not illustrated, a rear end portion of an intermediate shaft is coupled to the front end portion of the inner shaft 9*a* via a universal joint. Furthermore, a front end portion of the intermediate shaft is coupled to a pinion shaft of a steering gear box via a universal joint.

Figure 2:
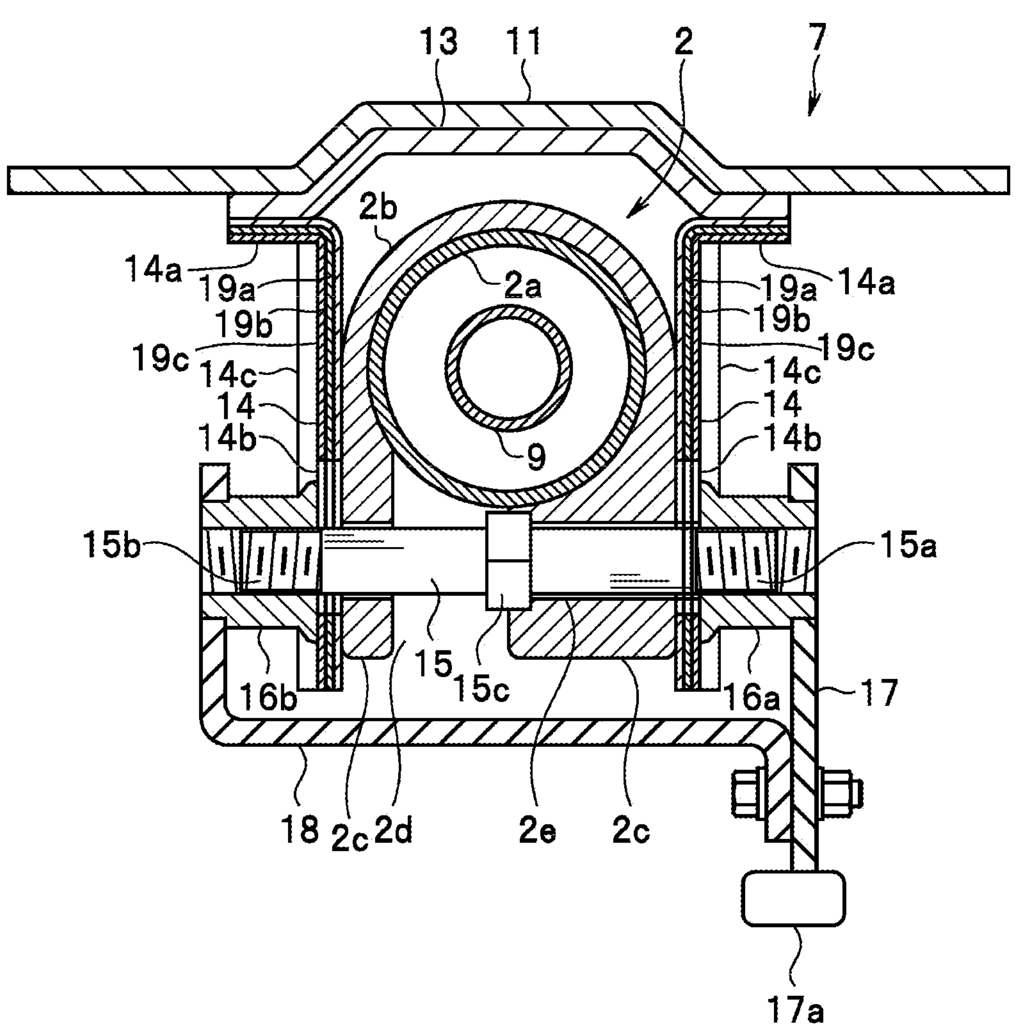
FIG. 2 illustrates a section taken along line II-II given in FIG. 1.

As illustrated in FIG. 2, the outer column 2*b* includes clamping portions 2*c* at two opposite sides thereof in a direction orthogonal to the axial direction thereof. The clamping portions 2*c* are disposed at a part of the outer column 2*b* where the support bracket 7 is attached. The clamping portions 2*c* extend downward. The clamping portions 2*c* have flat side surfaces. The flat side surfaces receive the inner surfaces of respective clamp plates 14, which will be described below. A slit 2*d* is provided between the clamping portions 2 *c* and opens downward. The slit 2*d* extends the axial direction. The slit 2*d* allows a part of the outer column 2*b* where the clamping portions 2*c* are located to be elastically widened to have an increased inside diameter.

The rear end portion of the inner column 2*a* extends beyond the part where the support bracket 7 is attached, toward the rear end of the outer column 2*b*. The support bracket 7 is configured to fasten the outer column 2*b* to the inner column 2*a*. When the outer column 2*b* is fastened to the inner column 2*a* by the support bracket 7, the front-rear position of the outer column 2*b* is restrained. The outer shaft 9*b* of the steering shaft 9 is movable in the front-rear direction together with the outer column 2*b* via the slidable torque transmission element.

Figure 3:
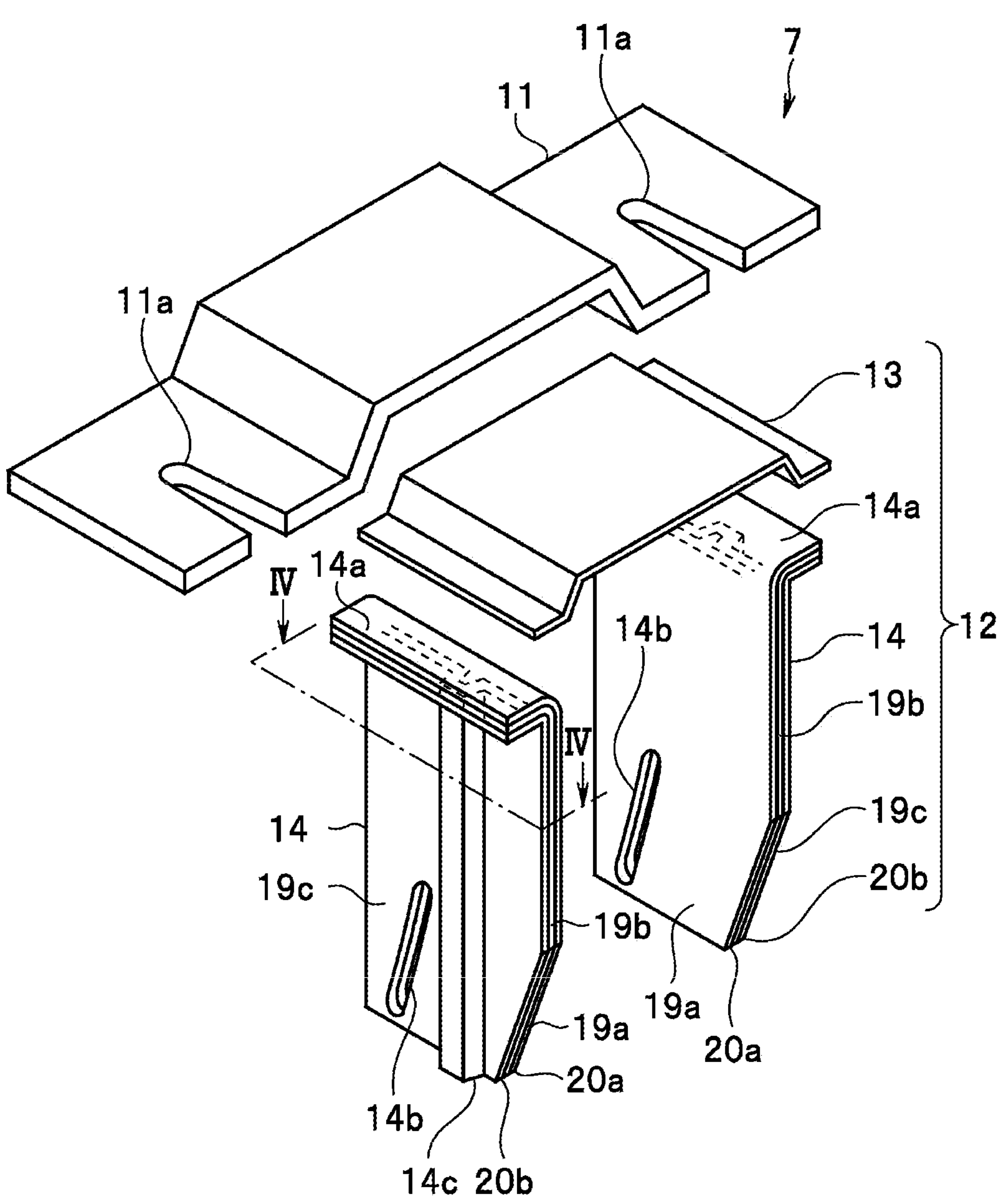
FIG. 3 is an exploded perspective view of a tilt bracket.

As illustrated in FIGS. 2 and 3, the support bracket 7 includes a mounting plate 11 and a tilt bracket (also referred to as a "column bracket") 12. The tilt bracket 12 includes a top plate 13, and a pair of clamp plates 14 that are disposed opposite each other. The clamp plates 14 are symmetrical in shape. The clamp plates 14 each include at the upper end thereof a flange 14*a* that is bent outward in an L shape. The flange 14*a* is joined to the top plate 13 by welding or the like.

As illustrated in FIG. 2, with the flanges 14*a* of the clamp plates 14 joined to the top plate 13, the clamp plates 14 face toward each other and extend parallel to each other. The outer surfaces of the clamping portions 2*c* of the outer column 2*b* are in contact with the inner surfaces of the respective clamp plates 14 that face toward each other.

The top plate 13 of the tilt bracket 12 is joined to the mounting plate 11 by welding, crimping, or the like to be permanently affixed thereto. The mounting plate 11 has incisions 11*a* at two opposite sides thereof in the vehicle width direction. The incisions 11*a* are open toward the front of the vehicle body. A steering-support-beam mounting attachment (not illustrated) is fitted to the incisions 11*a* and is screwed there. The steering-support-beam mounting attachment is fixed to the steering support beam 8 via a fastening member such as a bolt.

The clamp plates 14 of the tilt bracket 12 have respective tilt guide holes 14*b*. The tilt guide holes 14*b* are each an oblong hole having an arc shape centered on the clevis pin 3*c* of the clevis 3. Note that the tilt guide holes 14*b* may each be a linear oblong hole extending along a tangent to an arc centered on the clevis pin 3*c*.

A bolt receiving hole 2*e* extends through the clamping portions 2*c* of the outer column 2*b*. The bolt receiving hole 2*e* receives a tilt bolt 15. Two opposite ends of the tilt bolt 15 project outward from the tilt guide holes 14*b* of the respective clamp plates 14. The tilt bolt 15 has threaded portions 15*a* and 15*b* at the two opposite ends thereof.

One of the two threaded portions 15*a* and 15*b* is inversely threaded with the same pitch as the other. The tilt bolt 15 further has a prismatic flange 15*c* at a middle part thereof. The prismatic flange 15*c* is embedded in one of the two opposite surfaces that define the slit 2*d*. Thus, the tilt bolt 15 is prevented from rotating.

Nuts 16*a* and 16*b* are screwed on the respective threaded portions 15*a* and 15*b* of the tilt bolt 15. A tilt adjustment lever 17 is fixed to one of the nuts 16*a* and 16*b*. An operation knob 17*a* is fixed to the tip of the tilt adjustment lever 17. One end of an interlocking lever 18 is fixed to the other of the nuts 16*a* and 16*b*. The other end of the interlocking lever 18 is coupled to the tilt adjustment lever 17.

Figure 4:
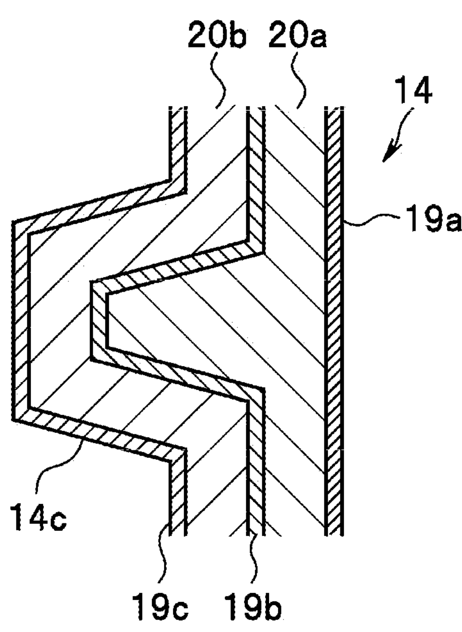
FIG. 4 illustrates a section taken along line IV-IV given in FIG. 3.

Each clamp plate 14 has a multilayer structure (so-called mille-feuille structure). As illustrated in FIG. 4, the clamp plate 14 according to the present embodiment has a five-layer structure. The clamp plate 14 includes three thin steel sheets, namely first to third thin steel sheets 19*a* to 19*c*, arranged in that order from the inner side to the outer side; and highly damping matter 20*a* and 20*b* interposed between each adjacent two of the thin steel sheets 19*a* to 19*c*. The highly damping matter 20*a* and 20*b* is also present between portions of the thin steel sheets 19*a* to 19*c* that form the flange 14*a*.

To suppress the increase in the rigidity of the tilt bracket 12, the total thicknesses of the thin steel sheets 19*a* to 19*c* and the highly damping matter 20*a* and 20*b* needs to be made substantially equal to or less than the total thickness of a conventional product constituted by steel sheets alone. However, if damping matter having a low rigidity is employed, the above condition does not necessarily apply.

The highly damping matter 20*a* and 20*b* is a coating agent applied between the first and second thin steel sheets 19*a* and 19*b* and between the second and third thin steel sheets 19*b* and 19*c*. The highly damping matter 20*a* and 20*b* is made of, for example, a structural material obtained by adding organic matter having excellent damping properties to an adhesive, and exert two functions of adhesion and damping.

By reducing the thickness of the first to third thin steel sheets 19*a* to 19*c* and employing a coating agent as the highly damping matter 20*a* and 20*b*, the total thickness of the clamp plate 14 is made substantially equal to or less than the total thickness of a conventional clamp plate. The clamp plate 14 may have a three-layer structure or a seven or more-layer structure as long as the structure includes highly damping matter that is interposed between steel plates. The thickness of each thin steel sheet and the material of the highly damping matter are not limited.

The clamp plate 14 has a bead 14*c*. As illustrated in FIG. 3, the bead 14*c* is located on the front side relative to the tilt guide hole 14*b* and extends in the top-bottom direction. The bead 14*c* extends in the top-bottom direction from end to end of the side surface of the clamp plate 14 excluding the flange 14*a*.

As illustrated in FIG. 4, the bead 14*c* is formed by causing a stack of the second and third thin steel sheets 19*b* and 19*c* and the highly damping matter 20*a* and 20*b* to project outward. The first thin steel sheet 19*a* remains flat. Forming the bead 14*c* extending from end to end of the clamp plate 14 in the top-bottom direction increases the area of application of the highly damping matter 20*a* and 20*b*.

Now, how the present embodiment employing the above configuration works will be described. When the driver grips the operation knob 17*a* of the support bracket 7 supporting the steering column 2 and pushes down the tilt adjustment lever 17, the nuts 16*a* and 16*b* are loosened from the tilt bolt 15. Accordingly, the clamping pressure applied from the pair of clamp plates 14 included in the tilt bracket 12 to the clamping portions 2*c* located at the two opposite sides of the outer column 2*b* is removed, whereby the outer column 2*b* and the inner column 2*a* are allowed to move in the axial direction.

In this state, when the driver pulls the steering wheel 10 or pushes down the steering wheel 10 toward the front of the vehicle body, the outer shaft 9*b* moves in the axial direction together with the outer column 2*b*. Thus, the front-rear position of the steering wheel 10 relative to the driver is adjusted (a telescopic mechanism).

On the other hand, when the driver moves the steering wheel 10 in the top-bottom direction, the steering column 2 rotates in the same direction about the clevis pin 3*c* of the clevis 3. Such a movement is allowed by the tilt bolt 15 moving along the tilt guide holes 14*b* provided in the clamp plates 14. In this process, the steering shaft 9 moves in the top-bottom direction together with the steering column 2, whereby the top-bottom position of the steering wheel 10 relative to the driver is adjusted (a tilt mechanism).

After the position of the steering wheel 10 is adjusted, when the driver pulls up the tilt adjustment lever 17 by using the operation knob 17*a*, the nuts 16*a* and 16*b* are fastened to narrow the space therebetween in the axial direction of the tilt bolt 15. Accordingly, the pair of clamp plates 14 press the clamping portions 2*c* at the two opposite sides of the outer column 2*b* and thus clamp the outer column 2*b* to the inner column 2*a*. This clamping tightens the nuts 16*a* and 16*b* on the tilt bolt 15 and fixes the positions of the steering column 2 and the steering shaft 9.

When the driver causes the vehicle to travel with the position of the steering column 2 fixed by the support bracket 7, an input from the road surface is transmitted through the tires, the suspension, and the vehicle body to vibrate the steering shaft 9.

If such vibrations excite natural vibration (resonance) of the steering shaft 9, the driver who is gripping the steering wheel 10 perceives the vibration and feels discomfort and anxiety. As described above, vibration of the vehicle body frame 4 is transmitted to the steering column 2 through the support bracket 7. That is, increasing the rigidity of the support bracket 7 reduces the vibration of the steering shaft 9.

On the other hand, the tilt bracket 12 is configured to clamp and fix the inner column 2*a* and the outer column 2*b* of the steering column 2 by using the clamp plates 14. Therefore, if the rigidity of the support bracket 7 is increased, the driver is required to operate the tilt adjustment lever 17 with a large force when using the telescopic mechanism and/or the tilt mechanism described above, which is inconvenient for the driver.

It is known that the support bracket 7 experiences shear in the top-bottom direction under natural vibration (resonance). In the present embodiment, since the clamp plates 14 each have the bead 14*c*, the area of application of the highly damping matter 20*a* and 20*b* is increased, whereby the vibration due to the resonance occurring in the support bracket 7 is damped. Thus, the steering vibration transmitted to the steering wheel 10 is effectively reduced.

The first thin steel sheets 19*a* of the respective clamp plates 14 that face toward each other have no beads. Therefore, the clamping portions 2*c* at the two opposite sides of the outer column 2*b* are reliably clamped by the entire side surfaces of the first thin steel sheets 19*a*.

The beads 14*c* extend end to end of the respective clamp plates 14 in the top-bottom direction, which is parallel to the direction of the shear that occurs under the natural vibration of the steering column 2. Therefore, the highly damping matter 20*a* and 20*b* is allowed to deform greatly with respect to the shear occurring in the top-bottom direction. Such a deformation of the highly damping matter 20*a* and 20*b* efficiently damps the vibration of the steering column 2.

Since the vibration is damped by the support bracket 7, there is no need to reexamine the natural frequencies of individual components constituting the steering apparatus or to redesign components for, for example, increasing the rigidity. Therefore, high versatility is provided, which is economical.

The disclosure is not limited to the above embodiment. For example, each clamp plate 14 may have two or more lines of bead 14*c* that extend at a predetermined interval.

According to the disclosure, the pair of clamp plates that are disposed opposite each other and are configured to clamp the steering column at two opposite side surfaces of the steering column each have a multilayer structure including a plurality of steel sheets and damping matter interposed between each adjacent two of the steel sheets, the steel sheets and the damping matter being stacked in a direction in which the steering column is to be clamped. Furthermore, the clamp plates each have a bead projecting outward and extending in the top-bottom direction. Therefore, if natural vibration occurs, the damping matter deforms to damp the vibration. Thus, the steering vibration is effectively reduced.

The invention claimed is:

1. A steering apparatus comprising:

a steering shaft to an end portion of which a steering wheel is fixed;

a steering column supporting the steering shaft while allowing the steering shaft to rotate; and a support bracket fixed to a vehicle body frame and supporting a portion of the steering column, the portion being located close to the steering wheel, the support bracket comprising a pair of clamp plates disposed opposite each other and configured to clamp the steering column at two opposite side surfaces of the steering column, wherein the clamp plates each have a multilayer structure comprising a plurality of steel sheets and damping matter interposed between each adjacent two of the steel sheets, the steel sheets and the damping matter being stacked in a direction in which the steering column is to be clamped, and wherein the clamp plates each comprise a bead projecting outward and extending in a top-bottom direction.

2. The steering apparatus according to claim 1, wherein the bead extends end to end of the clamp plate in the top-bottom direction.

3. The steering apparatus according to claim 1, wherein the damping matter is a coating agent.

4. The steering apparatus according to claim 1, wherein the steel sheets in each of the clamp plates are three steel sheets with the damping matter interposed between each adjacent two of the steel sheets.

5. The steering apparatus according to claim 1, wherein the clamp plates face toward each other at respective surfaces each formed by one of the steel sheets that is free of the bead.

* * * * *